United States Patent
Mayer et al.

(10) Patent No.: US 8,825,741 B2
(45) Date of Patent: Sep. 2, 2014

(54) METHOD FOR THE CREATION OF AN INTELLIGENT DOCUMENT, AND DEVICE FOR CARRYING OUT SAID METHOD

(75) Inventors: Boris Mayer, Bonn (DE); Thomas Ogilvie, Bonn (DE); Henning Endruscheit, Merzenich (DE); Volker Klös, Langgons (DE)

(73) Assignee: Deutsche Post AG, Bonn (DE)

( * ) Notice: Subject to any disclaimer, the term of this patent is extended or adjusted under 35 U.S.C. 154(b) by 720 days.

(21) Appl. No.: 12/447,259

(22) PCT Filed: Oct. 23, 2007

(86) PCT No.: PCT/EP2007/009184
§ 371 (c)(1),
(2), (4) Date: Apr. 27, 2009

(87) PCT Pub. No.: WO2008/049580
PCT Pub. Date: May 2, 2008

(65) Prior Publication Data
US 2009/0327409 A1 Dec. 31, 2009

(30) Foreign Application Priority Data
Oct. 27, 2006 (EP) .................................. 06022478

(51) Int. Cl.
| | |
|---|---|
| *G06F 15/16* | (2006.01) |
| *G06F 15/173* | (2006.01) |
| *G06Q 50/32* | (2012.01) |
| *G06Q 50/28* | (2012.01) |
| *G06Q 10/08* | (2012.01) |
| *G06Q 10/10* | (2012.01) |
| *H04L 29/08* | (2006.01) |
| *G07B 17/00* | (2006.01) |
| *H04L 29/06* | (2006.01) |

(52) U.S. Cl.
CPC .......... *G06Q 50/32* (2013.01); *H04L 29/08522* (2013.01); *G06Q 50/28* (2013.01); *G07B 2017/00419* (2013.01); *G06Q 10/08* (2013.01); *G06Q 10/10* (2013.01); *H04L 67/1006* (2013.01); *G07B 2017/00443* (2013.01); *H04L 67/00* (2013.01); *H04L 63/205* (2013.01); *H04L 29/06047* (2013.01); *G07B 17/00435* (2013.01); *H04L 67/42* (2013.01); *G07B 2017/00766* (2013.01)
USPC ........... 709/203; 709/219; 709/223; 709/226; 709/227

(58) Field of Classification Search
CPC .................. H04L 29/06047; H04L 29/08522; H04L 63/205; H04L 67/00; H04L 67/42; H04L 67/47; H04L 67/1006
USPC .................................................. 709/200–253
See application file for complete search history.

(56) References Cited

U.S. PATENT DOCUMENTS 5,822,739 A * 10/1998 Kara .............................. 705/410
5,835,914 A * 11/1998 Brim ..................................... 1/1
(Continued)

FOREIGN PATENT DOCUMENTS

| DE | 102004046051 A1 | 3/2006 |
| EP | 0717374 B1 | 3/2002 |

(Continued)

OTHER PUBLICATIONS

Beckman, George, Computer Confluence, Prentice Hall, Inc., 2003, pp. 265-286, XP007901860, ISBN: 0-13-066188-0.
(Continued)

*Primary Examiner* — David Lazaro
*Assistant Examiner* — Farzana Huq
(74) *Attorney, Agent, or Firm* — International IP Law Group, PLLC

(57) ABSTRACT

There is provided a method and system for the creation of an intelligent document that can be executed upon the occurrence of a precondition. An exemplary method comprises providing displayable contents that include static contents and dynamic contents, and inserting the dynamic contents into the intelligent document separately from the static contents.

26 Claims, 4 Drawing Sheets

(56) References Cited

U.S. PATENT DOCUMENTS

| | | | |
|---|---|---|---|
| 6,233,565 B1* | 5/2001 | Lewis et al. | 705/35 |
| 6,939,063 B2* | 9/2005 | Bussell | 400/103 |
| 6,965,451 B1* | 11/2005 | Ogg et al. | 358/1.8 |
| 2005/0065892 A1* | 3/2005 | Ryan et al. | 705/62 |
| 2005/0278266 A1* | 12/2005 | Ogg et al. | 705/408 |
| 2007/0100672 A1* | 5/2007 | McBrida et al. | 705/6 |

FOREIGN PATENT DOCUMENTS

| | | |
|---|---|---|
| WO | WO 01/35346 A3 | 5/2001 |
| WO | WO 2005/029265 A3 | 3/2005 |

OTHER PUBLICATIONS

Kaminaris, S. Fesler, et al., Jetzt lerne ich, JavaServer Pages, Markt + Technik Verlag, Munchen, 2001, XP007901852, ISBN: 3-8272-6009-4, pp. 264-273, Germany; Translation: JavaServer Pages, Title Page, Table of Contents, pp. 227-236.

Henning, P. A., et al., Taschenbuch Programmiersprachen, Fachbuchverlag Leipzig IM Carl Hanser Verlag, Leipzig, 2004, pp. 297-315, XP007901853, ISBN: 3-446-22580-3, Translation of Summary of cited chapters 14.1-14.6 (pp. 297-315), Title: Handbook Computer Languages.

* cited by examiner

METHOD FOR THE CREATION OF AN INTELLIGENT DOCUMENT, AND DEVICE FOR CARRYING OUT SAID METHOD

CROSS REFERENCE TO RELATED APPLICATIONS

Pursuant to 35 U.S.C. §371, this application is the United States National Stage Application of International Patent Application No. PCT/EP2007/009184, filed on Oct. 23, 2007, the contents of which are incorporated by reference as if set forth in their entirety herein, which claims priority to European (EP) Patent Application No. 06022478.9, filed Oct. 27, 2006, the contents of which are incorporated by reference as if set forth in their entirety herein.

BACKGROUND

It is a known procedure from German patent application DE 10 2004 046 051 A1 to use an intelligent document to provide postage indicia generated in a central server to an operating unit via a network. Intelligent documents contain not only text elements and graphic elements but also a process logic that makes it possible to change the content of the document and to carry out prescribed processes. In particular, in this prior-art method, the printing of a postage indicium contained in such an intelligent document is logged in a central database and, before the printing procedure, it is ascertained whether this postage indicium has already been printed out before. If this is the case, the printing is not permitted, thereby preventing multiple printing of the postage indicium with fraudulent intent. The logging of the printing and the checking steps are carried out by means of the process logic of the intelligent document, said process logic controlling especially the communication between the operating unit the central database. In order to execute the process logic, a program execution environment is needed that is contained in a display program that is executed in the operating unit of the customer and that is configured in such a way that it can display and interpret regular documents as well as intelligent documents. An example of such a display program is "Adobe Reader" made by the Adobe Company, whose more recent versions can process conventional PDF documents (PDF: Portable Document Format) as well as intelligent PDF documents.

SUMMARY OF THE INVENTION

An exemplary embodiment of the present invention may provide the ability to create an intelligent document quickly and reliably.

It is especially advantageous to use an exemplary embodiment of the present invention in systems for producing labels or other print-outs that are to be applied onto mailpieces or other goods to be transported.

In this case, it is especially advantageous for address data and/or franking-relevant data to be examples of dynamic contents as set forth in an exemplary embodiment of the present invention.

However, an exemplary embodiment of the present invention is also suited for the use of other dynamic information and in other technical contexts, for example, for the automation of other logistics procedures, of production procedures and of the creation and processing of information. Especially advantageous areas of application are those in which dynamic information is displayed and/or processed in a static frame.

The static information comprises information that especially allows the embedding of data.

A frame is a partial area of a graphic display, especially of a screen page, for example, a graphic user interface. An individual segment is referred to as a frame, and all of the frames may be collectively referred to as a frameset.

The use of frames may allow the parallel display of several individual documents that optionally can be moved independently of each other. Contents from different sources or from different data sources can be combined with each other via the frames.

Moreover, inline frames (IFrames) can be used. They may allow an especially simple integration of data into a displayed screen page.

Accordingly, a method of the above-mentioned type is put forward in which the intelligent document comprises a program which, when a precondition has been met, can be executed using a program execution environment and that contains contents that can be displayed with a display program.

According to an exemplary embodiment of the present invention, the method is carried out in such a way that two different types of contents that can come from one or more sources are inserted into the intelligent document.

A first type of contents comprises static contents. Static contents preferably match among multiple documents.

The static contents are preferably contents that are suitable for creating multiple documents. The creation of multiple documents is very advantageous but not necessary.

The static contents may include, for example, frame information for creating documents or they are other information that is updated less often than with the dynamic contents, preferably only when a predefinable time interval expires or when an event is reached. As an alternative, it is possible to leave the static data completely unchanged.

Moreover, an intelligent document may be created comprising a program which, when a precondition has been met, can be executed with a program execution environment, said intelligent document containing contents that can be displayed using a display program. The intelligent document may contain a program module that is configured to create displayable information indicating the result of the checking step in order to check whether the precondition has been met within the intelligent document.

An exemplary embodiment of the invention provides that the program module is a component of the static contents.

A refinement of an exemplary embodiment of the present invention is characterized in that the program module is a component of the dynamic contents.

An especially preferred exemplary embodiment of the present invention provides that the program module is either a component of the dynamic contents or of the static contents.

Moreover, a device for creating an intelligent document according to an exemplary embodiment of the present invention is put forward comprising a program which, when a precondition has been met, can be executed using a program execution environment and that contains contents that can be displayed with a display program. The device may be configured to insert a program module into the intelligent document, said program module being configured to create displayable information indicating the result of the checking step in order to check whether the precondition has been met within the intelligent document.

A refinement of the method, of the intelligent document, of the computer program product and of the device according to an exemplary embodiment of the present invention provides that the intelligent document itself contains a program module with which information indicating the result of a checking step can be created. In this manner, the intelligent document itself is capable of providing information indicating the result of a checking step, so that the result of the checking step is displayed irrespective of the configuration of the display program.

Displayable information within an intelligent document may comprise within the scope of an exemplary embodiment of the present invention information that can be displayed, for example, on a monitor using the display program. The intelligent documents can contain not only displayable contents but also additional contents such as, for example, program codes that, at least in a normal display mode, are not shown with a display program.

The method for creating an intelligent document according to an exemplary embodiment of the present invention can be refined in various ways, said intelligent document comprising a program which, when a precondition has been met, can be executed using a program execution environment, and said intelligent document containing contents that can be displayed with a display program.

A refinement of the method, of the intelligent document and of the device according to an exemplary embodiment of the present invention may provide that the static contents are transmitted by a server via a network to the client.

A refinement of the method, of the intelligent document and of the device according to an exemplary embodiment of the present invention may provide that the dynamic contents are transmitted by a server via a network to the client.

This allows documents to be created especially quickly.

A transmission of the dynamic contents that takes place irrespective of whether the static contents have been transmitted or not has the advantage that the data transmission resources needed for the creation of an intelligent document are reduced.

This advantage is even more pronounced if multiple intelligent documents are being created.

If multiple intelligent documents are being created, it may be advantageous to transmit the static contents once and to combine them with different dynamic contents to form different intelligent documents.

Thus, it is possible to use static contents that were created once in order to create multiple intelligent documents that differ from each other.

A refinement of the method, of the intelligent document, of the computer program product and of the device according to an exemplary embodiment of the present invention may provide that the static contents and the dynamic contents are transmitted separately from each other.

A refinement of the method, of the intelligent document, of the computer program product and of the device according to an exemplary embodiment of the present invention may provide that the transmission takes place at different times.

The method, the intelligent document, the computer program product and the device according to an exemplary embodiment of the present invention may be characterized in that the transmission takes place via different transmission routes.

A refinement of the method, of the intelligent document, of the computer program product and of the device according to an exemplary embodiment of the present invention may provide that the static contents are made available by a data source that is different from that for the dynamic contents.

The method, the intelligent document, the computer program product and the device may be characterized in that the static contents are transmitted by a first server and in that the dynamic contents are transmitted by another server.

A refinement of the method, of the intelligent document, of the computer program product and of the device according to an exemplary embodiment of the present invention may provide that the static data is stored in an area of a client.

Such an exemplary embodiment may provide the advantage that the static data is available in an especially simple and advantageous manner for purposes of creating multiple—preferably different—intelligent documents.

The documents can be utilized especially by a client. The client is advantageously available to a user of the system and is thus also referred to in the present application as a user client.

The client may be preferably configured in such a way that it recognizes if the transmitted document is an intelligent document. In a refinement of an exemplary embodiment of the present invention, this takes place in that the presence of confirmation information is checked. This confirmation information is, for example, a signature.

The method, the intelligent document, the computer program product and the device according to an exemplary embodiment of the present invention may provide that, when a document is opened, the client checks whether it has been signed.

In a refinement of an exemplary embodiment of the present invention, it is checked—preferably in another checking step—whether the signature with which the document was signed is valid.

The static contents may be preferably transmitted separately from the dynamic contents. The static contents are, for example, layout information about the design of the document.

Refinements of an exemplary embodiment of the present invention may provide for processing the static contents partially, predominantly or completely differently from the way the dynamic contents are processed.

For example, the static contents may differ from the dynamic contents in terms of the point in time at which they were created.

Moreover, the static contents and the dynamic contents can also differ from each other in terms of the event that triggered them.

A refinement of the method, of the intelligent document, of the computer program product and of the device according to an exemplary embodiment of the present invention may provide that the static contents are transmitted when a first event has occurred.

The method, the intelligent document, the computer program product and the device may be characterized in that the static information is transmitted when an event of a first type of event has occurred.

A refinement of the method, of the intelligent document, of the computer program product and of the device according to an exemplary embodiment of the present invention may provide that the dynamic contents are transmitted when a second event has occurred.

The method, the intelligent document, the computer program product and the device may be characterized in that the dynamic information is transmitted when an event of a second type of event has occurred.

A refinement of the method, of the intelligent document, of the computer program product and of the device according to an exemplary embodiment of the present invention may provide that the occurrence of the second event is ascertained, within the scope of a checking step.

An embodiment of the method, of the intelligent document, of the computer program product and of the device according to an exemplary embodiment of the present invention may be characterized in that the first event differs from the second event.

A refinement of the method, of the intelligent document, of the computer program product and of the device according to an exemplary embodiment of the present invention may provide that the first type of event differs from the second type of event.

Moreover, an intelligent document may be created comprising a program which, when a precondition has been met, can be executed using a program execution environment and that contains contents that can be displayed with a display program. The intelligent document may contain a program module that is configured to create displayable information indicating a result of the checking step in order to check whether the precondition has been met within the intelligent document.

Moreover, a device for creating an intelligent document according to an exemplary embodiment of the present invention is put forward comprising a program which, when a precondition has been met, can be executed using a program execution environment and that contains contents that can be displayed with a display program. The exemplary device is configured to insert a program module into the intelligent document, said program module being configured to create displayable information indicating the result of the checking step in order to check whether the precondition has been met within the intelligent document.

A refinement of an exemplary embodiment of the present invention exploits the fact that the intelligent document itself contains a program module with which information indicating the result of a checking step can be created. Consequently, the intelligent document itself may be capable of providing information indicating the result of a checking step, so that the result of the checking step is displayed irrespective of the configuration of the display program.

Displayable information within an intelligent document is referred to herein as information that can be displayed, for example, on a monitor, using the display program. Intelligent documents can contain not only displayable contents but also additional contents such as, for example, program codes that, at least in a normal display mode, are not displayed by a display program.

Within the scope of the checking steps according to an exemplary embodiment of the present invention, it is advantageously checked whether certain preconditions have been met for the use of the functionality of the intelligent document. If these preconditions have been met, a positive result of the checking step may be displayed. If the preconditions have not been met, a negative checking result may be displayed, so that the user is informed as to which precondition has not been met. He or she can use this knowledge to meet the precondition in question.

In a method, an intelligent document and a device according to an exemplary embodiment of the present invention, it may be provided that the checking step is carried out by the program module.

Advantageously, the program module in this exemplary embodiment is also configured to execute the checking step, so that the intelligent document can check itself, irrespective of the specific configuration of the display program.

A refinement of the method, of the intelligent document and of the device according to an exemplary embodiment of the present invention may be characterized in that, during the checking step, it is checked whether the program execution environment is available.

This refinement has the advantage that it entails checking whether the program execution environment is available so that, if applicable, the user can be informed that the program execution environment is not present and thus that certain functions of the intelligent document are not available.

If the program execution environment is not available, however, the checking step cannot be performed directly by the execution of a program. By the same token, the information indicating a negative result of the checking step cannot be inserted into the intelligent document by the program module.

Consequently, a method according to an exemplary embodiment of the present invention includes the fact that displayable information indicating a negative result of the checking step may be inserted into the intelligent document, and that the program module is configured to convert the information indicating the negative result of the checking step into displayable information indicating a positive result of the checking step.

Moreover, an exemplary embodiment of the intelligent document provides that the intelligent document contains displayable information indicating a negative result of the checking step and that said information can be converted by the program module into displayable information indicating a positive result of the checking step.

Furthermore, a device according to an exemplary embodiment of the present invention may be characterized in that the device is configured to insert displayable information indicating a negative result of the checking step into the intelligent document, and in that the program module is configured to convert the displayable information indicating the negative result of the checking step into information indicating a positive result of the checking step.

In this exemplary embodiment, the checking as to whether the program execution environment is present, can advantageously be carried out implicitly by the program module, which creates the information indicating the result of the checking step within the intelligent document. This is achieved in that, through the execution of the program module, which can only occur if the program execution environment is available, information indicating a positive result of the checking step is created by converting information indicating a negative result of the checking step already present in the intelligent document. If the program execution environment is not available, the program module cannot be executed and the information indicating the negative result of the checking step is retained.

In a refinement of the method, of the intelligent document and of the device according to an exemplary embodiment of the present invention, it is provided that the program controls the one-time printing of a postage indicium and that the intelligent document is transmitted by a server via a network to a client.

The intelligent document and the device according to an exemplary embodiment of the present invention may also be characterized in that, when the postage indicium is printed for the first time, a message is transmitted from the client to the server and in that, on the basis of this message, the printing is logged in the server.

Moreover, in a method, an intelligent document and a device according to an exemplary embodiment of the present invention, it may be provided that the program for controlling the printing of the postage indicium can only be executed when a network connection exists between the client and the server, and when, on the basis of a query to the server, it is ascertained that that postage indicium had not been printed before.

This prevents a postage indicium that has been paid for once from being printed out multiple times.

The method, the intelligent document and the device according to an exemplary embodiment of the present invention may be characterized in that, during the checking step, it is checked whether there is access to the network.

Moreover, a refinement of the method, of the intelligent document and of the device according to an exemplary embodiment of the present invention may entail the fact that, during the checking step, a query to the server is made in which it is checked whether contents of the intelligent document have already been printed before.

The method, the intelligent document and the device according to an exemplary embodiment of the present invention includes the fact that the program execution environment is a component of the display program.

Moreover, a computer program product according to an exemplary embodiment of the present invention is provided that contains a computer program for executing a method of the type described above.

These and additional advantages, special features and practical refinements of an exemplary embodiment of the present invention are also elucidated on the basis of the embodiments, which are described below making reference to the figures.

DETAILED DESCRIPTION OF SPECIFIC EMBODIMENTS

Figure 1:
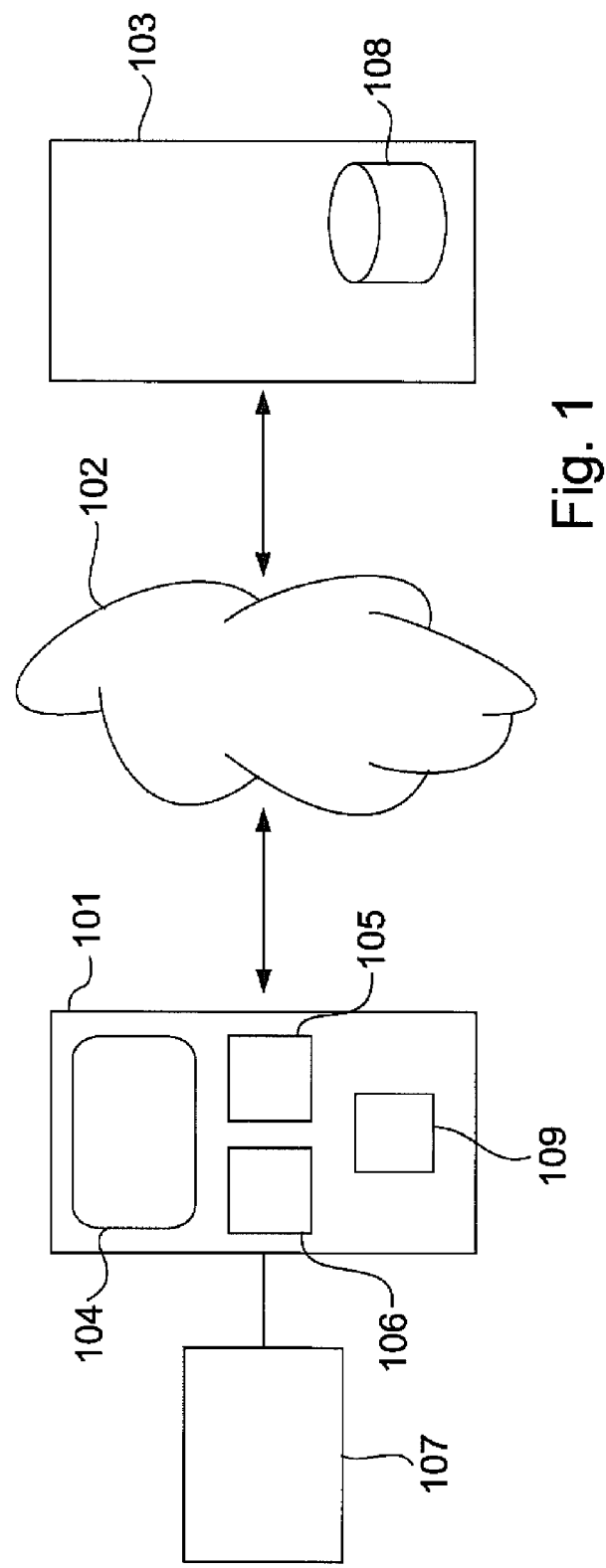
FIG. 1 is a block diagram of a client that is connected to a server from which intelligent documents can be transmitted to the client according to an exemplary embodiment of the present invention.

Exemplary embodiments of the present invention relate to a method for the creation of an intelligent document. Exemplary embodiments of the present invention also relate to an intelligent document and to a device for creating an intelligent document, said device being suitable for carrying out the method.

Exemplary embodiments of the invention will be explained below with reference to the figures.

It is especially advantageous to use exemplary embodiments of the present invention in systems for generating labels or other print-outs to be applied onto mailpieces or other goods to be transported.

In this case, it is especially advantageous that address data and/or franking-relevant data comprise dynamic contents as set forth in an exemplary embodiment of the present invention.

However, an exemplary embodiment of the present invention is also suited for the use of other dynamic information and in other technical contexts, for example, for the automation of other logistics procedures, of production procedures and of the creation and processing of information. Especially advantageous areas of application are those in which dynamic information is displayed and/or processed in a static frame.

The client recognizes that the transmitted document is an intelligent document in that it checks the presence and/or validity of a signature with which the document has been provided.

During the validity check of the signature, it is advantageously checked that it has not been manipulated.

Only after a successful validity check is the program code, which is contained, for example, as "JavaScript", activated.

The static contents are transmitted, for example, as layout information.

The static information comprises information that especially allows the embedding of data.

A frame is a partial area of a graphic display, especially of a screen page, for example, a graphic user interface. An individual segment is referred to as a frame, and the definition of all of the frames is called a frameset.

The use of frames allows the parallel display of several individual documents that optionally can be moved independently of each other. Via the frames, contents from different sources or from different data sources can be combined with each other.

Moreover, static contents in the form of inline frames (IF-rames) can be used. They allow an especially simple insertion of data into a displayed screen page.

The static data is linked to dynamic data.

According to an exemplary embodiment of the present invention, various solutions for taking over dynamic contents are provided.

Thus, for example, it is possible to transmit dynamic contents immediately before a display on the screen and/or before a printing procedure.

This can be done, for example, in one of the following ways:
by a text file (csv),
by direct transmission from a database or
via SOAP calls.

When dynamic contents are transmitted via SOAP calls, it is advantageous to use HTTPS as the transmission protocol, XML as the data format and SOAP as the control logic.

Although it is fundamentally possible to transmit binary data, preference is given to variants in which the binary data is generated by the client on the basis of data that had been previously transmitted in another format.

In this manner, the contents can be exchanged beyond platform and operating system boundaries.

Moreover, this facilitates the archiving of data stocks.

The advantages of this format can likewise be utilized by the conversion into the binary format that is carried out in the client.

The information (data) that has been converted into the binary format can be loaded, read and stored quickly, and it takes up less storage space on mass storage devices. Moreover, various object types (for example, text with images) can be stored relatively easily.

An embodiment in which no binary data is transmitted but rather is created after the transmission of data that had been transmitted in another format provides for the generation of barcodes or matrix codes in the client, for example, as a PDF document.

FIG. 1 schematically shows a client 101 that is connected to a server 103 via a network 102. The network 102 is, for example, the Internet or an intranet. The client 101 is, for example, a PC (personal computer).

The use of a personal computer is only to be understood as an example. This term refers to any data processing unit that can execute processing operations. In particular, this includes systems that can work with operating systems that differ from each other. For example, it is possible to use the Windows, Mac or Linux operating systems.

In particular, the client (user client) is a computer that is connected via the Internet. In order to enhance data security, the connection to the server is made especially via https (hyper text transfer protocol) with encrypted transmission. This makes "Man in the Middle" attacks more difficult.

It is advantageous to additionally provide SOAP calls with their own signature and to only process information if each applied signature has been recognized as being valid.

This information is, for example, data that was created with XML "Extended Markup Language".

It is advantageous to carry out the data exchange using SOAP (Simple Object Access Protocol).

In a preferred exemplary embodiment, the data is transmitted to the client by a download.

For example, an Adobe Reader, version 6.0.2, a more recent version of this program or Adobe Professional Software is installed on the client. Contents are opened via PDFs, by Adobe Reader and subsequently, the dynamic contents (especially user-specific data) are loaded by SOAP call into the main memory of the application Adobe Reader and then sent by a print job to a printer, together with the static data.

Advantageously, the client is configured in such a way that it has a display device 104 and at least one input device 109 as well as a memory 105 and a processor 106. In particular, a display program is stored in the memory 105; this program can be executed in the client 101 and it can open conventional documents having a certain format such as, for example, PDF documents, and can display their contents on the display device 104. Moreover, the display program allows the processing of intelligent documents, that is to say, it is configured to display displayable contents of intelligent documents on the display device 104, and to execute programs that are contained in the intelligent documents. For this purpose, the display program provides a program execution environment with which program commands contained in the programs can be interpreted and executed. Moreover, the client 101 is connected to a printing device 107 via an interface and it has a network interface for purposes of connecting to the network 102.

Intelligent documents are transmitted from the server 103 via the network 102 to the client 103. For this purpose, the server 103 has a system configured, for example, as a software program, in order to create intelligent documents. In an embodiment, the server 103 is configured as a server that provides intelligent documents for the printing of postage indicia. In this embodiment, the server 103 comprises a database 108 with one entry for each postage indicium that has been generated and transmitted to a client 101.

The intelligent documents comprise contents that can be displayed on the display device 104 using the display program and that consist of text elements and/or graphic elements. Furthermore, programs that can be executed using the program execution environment are embedded into the intelligent documents. These programs are scripts that comprise the program code that can be interpreted by the program execution environment. Displayable contents of the intelligent documents can be changed using the programs. Moreover, the programs allow the execution of additional processes such as, for example, the actuation of the printing device 102 for printing contents of the intelligent document, or for accessing the network interface. In the normal display mode of the display program, the program code is not displayed on the display device 104. Fundamentally, however, the display program can have a special display mode in which the program code can also be displayed.

Within the scope of an exemplary embodiment of the present invention, an intelligent document provided by the server also contains status information indicating the result of one or more checking steps. Here, displayable information indicating the checking results is created using one or more program modules that are likewise contained in the intelligent document. The program modules can be configured as autonomous programs or they can be part of a program that is provided for the execution of the main functionality of the intelligent document. Within the scope of the checking steps, it is ascertained whether certain preconditions for the use of the main functionalities of the intelligent document have been met. In this manner, in the eventuality of an unusable functionality, the user especially is informed about a precondition that might not have been met. He or she can use this knowledge to meet the precondition and thus to use the functionality of the intelligent document.

A precondition for the use of the functionality of an intelligent document is the availability of the program execution environment. As a rule, however, not all display programs for displaying documents in the format of the intelligent document have a suitable program execution environment. Thus, the program execution environment might not be present, for example, in older versions of the display program. Therefore, in an embodiment, a checking step especially checks whether the display program of the client 101 has a program execution environment that is suitable for executing the program contained in the intelligent document. In order to be able to correctly display the result of this checking step even if the program execution environment is not present, displayable information indicating a negative result of the checking step is already inserted into the document at the time when the intelligent document is created. Furthermore, a program module is inserted into the intelligent document and this program module—when it is executed—converts information indicating the negative result of the checking step into information indicating a successful execution of the checking step. The intelligent document is preferably configured in such a way that, after said intelligent document has been opened in the display program, the program module is automatically started if the program execution environment is present.

Checking whether the program execution environment is available is preferably carried out implicitly and this yields a positive or negative result, depending on whether the program module can be executed or not.

In addition to this checking step, in which a decision is made about the presence of the program execution environment, by the same token, other checking steps can be executed by a program contained in the intelligent document. The results of these checking steps can then be displayed in the same manner in that, using a program module, information indicating a negative result is converted into information indicating a positive result.

The conversion of the information indicating the negative result of the checking step into the display of a positive result of the checking step can be done by changing the information. For example, one or more characters can be added to the negative information in order to create information indicating a positive result of the checking step. Moreover, the status information can be configured, for example, to be colored. The information indicating the negative result of the checking step can be converted into information indicating a positive result using a color change that is effectuated by the program. Furthermore, it can also be provided that characters or symbols of the information indicating the negative result of the checking result are at least partially replaced by characters or symbols such that a positive result of the checking step is displayed. The checking result can be displayed visibly for the user or it can remain invisible.

Figure 2A:
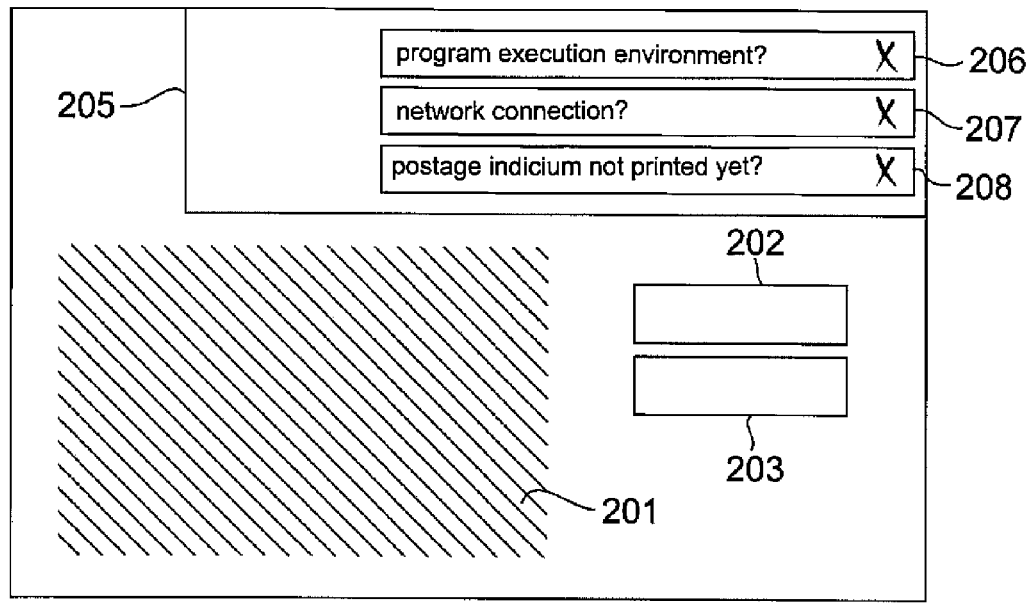
FIG. 2a is a block diagram showing displayable contents of an intelligent document with information indicating negative results of several checking steps according to an exemplary embodiment of the present invention.

FIG. 2a shows by way of an example a display of contents of an intelligent document on the display device 104 of a client 101. The intelligent document allows one-time printing of a postage indicium that can contain cryptographically secured data that allows its authenticity to be checked. The intelligent document comprises a main area 201 around which, for example, a sample of the postage indicium or of a franking label containing the postage indicium can be displayed. The sample can be printed as often as desired. For this purpose, the intelligent document provides a button 202 that is linked to a program that controls the sample printing and that is contained in the intelligent document. Moreover, the intelligent document contains another button 203 whose actuation triggers the printing of the valid postage indicium. The button 203 is linked to a program that controls the printing of the valid postage indicium and that is executed when the button is actuated. The buttons 202, 203 can be actuated by the operator of the client 101 using the input device 109.

Preferably, the printer that is available at the individual workplace of the user is automatically selected, that is to say, a program module is executed that controls the printing within the document. With this refinement of an exemplary embodiment of the present invention, the user is not able to utilize the printer selection option that is made available by the program execution environment. This further reduces the risk of fraud.

The printing of the valid postage indicium is logged, whereby the control of the logging is performed or triggered by a program of the intelligent document. In this context, the actuation of the button 203 causes the program to trigger the transmission of a message about the printing to the server 103 in whose database 108—after receipt of the message has been received—an appertaining record of the printing is added to the data record that is associated with the postage indicium. Preferably, an unambiguous identification code is associated with the postage indicium, and said identification code serves especially to identify the database entry and is also contained in the message. In order to prevent multiple printing of the postage indicium, before the activation of the button 203, a query to the database of the server takes place in order to ascertain whether the record of the printing is present. Moreover, the postage indicium cannot be displayed on the display device 104 in order to prevent copies of the display from being generated and used for franking mailpieces. This is achieved in an embodiment in that the postage indicium is contained in a concealed area of the intelligent document that cannot be displayed by the display program. In another embodiment, it is provided that the valid postage indicium is only called by the server 103 once the button 203 has been actuated for printing the postage.

In a refinement of an exemplary embodiment of the present invention that is specially protected against manipulation, the method is carried out in such a way or the device is configured in such a way that printing of a postage indicium is only possible if the display program has a program execution environment for executing programs that are embedded in the intelligent document, there is a connection from the client 101 to the network 102 and the programs can access said connection and the database does not contain a record of the printing of the postage indicium.

Therefore, preferably when the intelligent document is opened, checking steps are executed in which it is checked whether the above-mentioned preconditions have been met. The results of these checking steps are displayed in the intelligent document in a status display 205. The depicted status display contains a status field 206 for the information indicating the result of the checking as to whether the program execution environment is available, it contains a status field 207 for the information indicating the result of the checking as to whether a network connection exists, and it also contains a status field for the information indicating the result of the checking as to whether the postage indicium was already printed before. At first, the intelligent document provided by the server 103 contains the status display schematically shown in FIG. 2a, which comprises at least the information indicating a negative result of the first checking step in which the presence of the program execution environment is checked. The results of the other checking steps—in which the connection of the client 101 to the network 102 and the presence of the record of the printing in the database of the server 103 are checked—are preferably likewise displayed negatively. Fundamentally, this information can also be inserted into the document in neutral form and, after the execution of the checking steps, it can be converted into a positive or negative checking result, depending on the outcome. However, the fact that, at first, information indicating negative checking results is present in the document, especially has the advantage that the status information indicating these checking steps behaves in the same manner as the information indicating the results of the checking as to whether the program execution environment is present. This checking result cannot be inserted into the document in neutral form and converted after the checking has been completed, since the absence of the program execution environment would not allow a conversion in the case of a failure of the checking. In the embodiment of the status display, which is shown in FIG. 2a, the negative result of a checking step is displayed by an "X" inside the status fields 206, 207, 208.

After the intelligent document has been opened in the display program of the client 101, the checking steps are executed consecutively. After the successful execution of the checking steps, the appertaining information indicating the negative checking result is converted in the status display into information indicating positive checking results. Moreover, after the successful execution of a checking step, the next checking step is started. In particular, the intelligent document contains a program module with which, as already described above, the information indicating the negative result of the checking that is contained in the status field 206 as to whether the program execution environment is present is converted into a positive checking result. Subsequently, using the same program module or another program module, it is ascertained whether access to the network 102 exists in that, for example, a query is sent to the server 103. If a response to this query is received, the network connection exists, and the appertaining information in the status field 207 is converted into information indicating a positive result of the checking step. Furthermore, the database 108 of the server 103 is queried via the network 102 using a program module present in the intelligent document in order to ascertain whether the postage indicium has already been printed out before. If this is not the case, then the appertaining information in the status field 108 is converted into information indicating a positive result of the checking step. Moreover, the button 203 for initiating the printing of the valid postage indicium is made visible or activated in such a way that it can be actuated by the user.

Figure 2B:
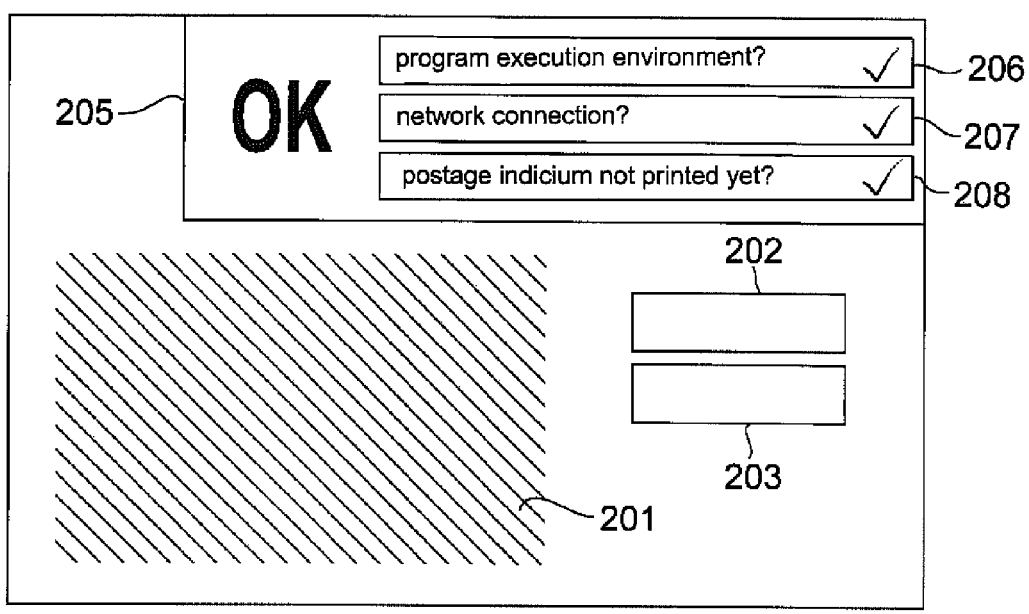
FIG. 2b is a block diagram showing displayable contents of an intelligent document with information indicating positive results of several checking steps according to an exemplary embodiment of the present invention.

By way of an example, FIG. 2b shows information indicating the positive results of the checking steps within the status display 205 of the intelligent document already presented in FIG. 2a. Here, by way of an example, the Xs shown in the status fields 206, 207, 208 have been replaced with checkmarks in order to indicate the positive checking results. Furthermore, in the shown embodiment of the intelligent document, it is provided that the successful execution of all checking steps is indicated by the letters "OK" which are likewise inserted using a program into the intelligent document as displayable content once the last checking step has been successfully executed. The display can, however, also be suppressed—if applicable visually—so that the user is informed, for example, only about errors that might have occurred in the checking process.

If a checking step could not be executed successfully, then the subsequent checking steps are preferably no longer executed. On the basis of a displayed negative result of a certain checking step, the user is informed about the absence of a precondition for the franking of a mailpiece using the intelligent document. Thus, the user is given the possibility to take measures in order to meet the appertaining preconditions. In the case of information indicating a negative result of the checking as to whether the program execution environment is available, the user can install, for example, a version of the display program on the client 101 containing the program execution environment. In the case of information indicating a negative result of the checking as to whether a network connection is present, the user can, for example, activate the network connection. If a negative result of the checking as to whether the postage indicium has already been printed out before is displayed, then the user knows that he or she cannot print out the postage indicium again, and so he or she can request a new postage indicium from the server 103.

Figure 3:
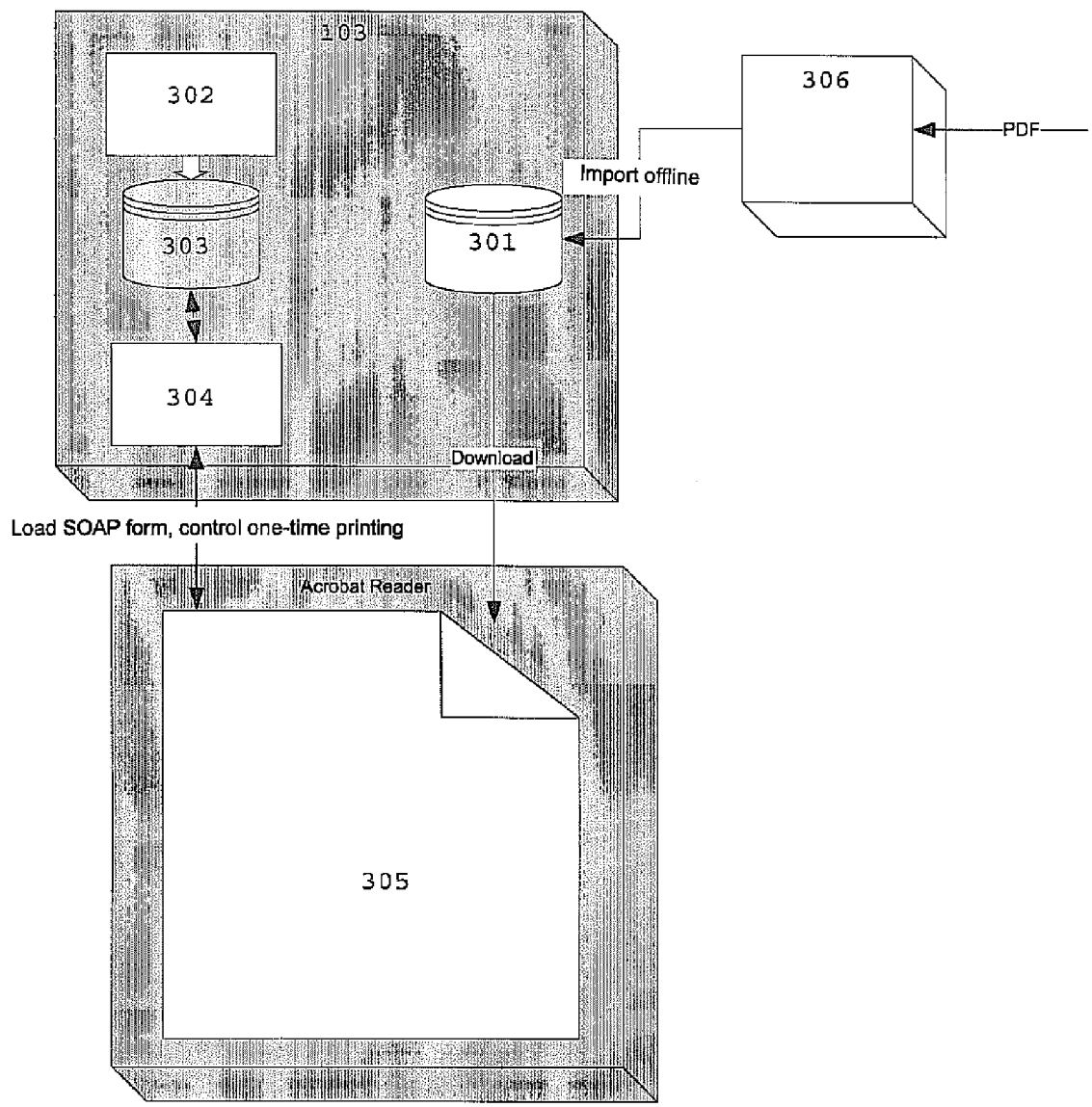
FIG. 3 is a schematic showing the integration of a document creation into a system according to an exemplary embodiment of the present invention.

FIG. 3 shows a schematic depiction of an integration of a document creation into a system according to an exemplary embodiment of the present invention.

The depicted system comprises a server 103 that makes it possible to transmit displayable contents.

The displayable contents consist of static contents and dynamic contents.

In the depicted embodiment, the static contents are inserted as PDF templates into a document that is to be created.

Dynamic contents are inserted into a document data record 303 by a suitable server, preferably by a Web server 302. If applicable, these dynamic contents are augmented by additional contents. The additional contents—depending on the envisaged use—can be static contents or dynamic contents. An addition of dynamic contents is preferred since this makes it possible to create identifiable documents in an especially simple and practical manner.

In a particularly preferred exemplary embodiment of the invention, this is done in that the dynamic contents are linked to licensing information 304.

An exemplary embodiment of the invention provides that the licensing information 304 is a component of the static contents.

A refinement of an exemplary embodiment of the present invention is characterized in that the licensing information 304 is a component of the dynamic contents.

An especially preferred exemplary embodiment of the invention provides that the licensing information 304 is either a component of the dynamic contents or of the static contents.

Below, an exemplary embodiment of the present invention will be described with reference to the example of generating labels. These labels are, for example, address labels and/or franking labels. Such labels are especially suitable as postage indicia and/or for controlling logistical processes, for instance, tracking and tracing as well as for controlling other logistical processes, for instance, for sorting mailpieces.

Advantageously, the labels—especially the address label and/or the franking label—are configured in such a way that they are machine-readable.

The term "mailpieces" is to be understood in the broadest sense of the word. It comprises all transport operations that involve transporting an object from an originating location to a destination. In particular, it refers to the transport of letters, parcels, packages, transportation boxes, pallets, containers or other transportation units that are suitable for shipping objects.

A refinement of an exemplary embodiment of the present invention comprises a system that allows customers to request and print labels via an online interface using a PC, and this will be referred to below as the user client. The interface is provided by a server that is referred to below as the POP server (POP: Parcel Online Postage). The features of the described POP server can be used individually or in any desired combination on a Web server. Therefore, the description of the POP server and of its use includes all types of Web servers.

In order to create the labels, the customer first creates one or more entries for mailpieces that are to be sent and places them into a shopping cart on a first page (NOW 1) provided by the POP server. For this purpose, the Web page NOW 1 has a button that allows the user to access another Internet page (NOW 2—shipping details) where the data of a shipment can be recorded and manipulated.

The data includes, for example, the sender address, the recipient address and a selection of the product which especially indicates the amount of postage for the shipment. Moreover, the user can select one or more additional services for the shipment, especially $CO_2$-neutral shipping and a roll service for round shipments.

Once the shopping cart contains at least one item, another button becomes active on the Web page NOW 1, that allows the customer to initiate a payment procedure. This is done using an online payment modality, whereby in particular, the customer can choose between an online bank transfer and a payment by PayPal.

After the customer has paid for the purchases in the shopping cart, he or she reaches a page (NOW 3) that contains links to PDF documents and that allows the printing of the purchased franking labels. Furthermore, after the payment has been made, customers receive an e-mail containing a link to the Web page NOW 3 that allows the Web page to be accessed once again at a later point in time as well. The e-mail is sent to an address that the customer had previously entered on the Web page NOW 1. If the value of the shopping cart exceeds a certain amount, then the access to the Web page NOW 3 via the link contained in the e-mail is secured by a PIN.

A refinement of an exemplary embodiment of the present invention comprises a voucher functionality that allows the customer to purchase vouchers and to use them to pay for postage indicia. The vouchers can be added to the shopping cart on the Web page NOW 1. Via an appropriate button on this page, the user reaches another page (NOW 2—voucher details) where voucher sets can be added to the shopping cart for a basic product that is likewise selected on this page. After the user has paid for the purchases in the shopping cart, a voucher code is displayed to him or her on the Web page NOW 3 for each purchased voucher. In order to later redeem the voucher, the customer enters the voucher code on the Web page NOW 1 when he or she generates the shopping cart.

An exemplary embodiment of the present invention is suitable for creating various types of labels, especially for generating labels to control logistical functions of the mailpieces, especially their transportation, sorting and/or forwarding. In this context, the labels contain, for example, monetary information as proof-of-payment, so that these can be, for example, franking labels.

However, it is likewise possible for the labels to contain additional information for handling the mailpieces—for example, a sender address, a recipient address or a shipping identification code. As a result, the labels can be used to monitor the shipping progress (tracking) or to confirm the shipping progress (tracing).

In a preferred exemplary embodiment, the labels contain not only the addresses of the sender and of the recipient but also a routing code associated with the recipient address, said code being used for the production of the mailpieces in a parcel or mail center of a shipping service provider.

In an especially preferred exemplary embodiment, the label contains an unambiguous label identification code. On the basis of the label identification code, instances of fraudulent use can be ascertained in which a franking label is used multiple times for the franking of mailpieces. For this purpose, the label identification codes of the issued franking labels are stored in a payment assurance system. When a mailpiece is produced, the label identification code is marked in the payment assurance system as having been used. Moreover, for each produced mailpiece, it is checked whether the label identification code has been marked as invalid. If this is the case, this constitutes an instance of fraudulent use. The routing code and the label identification code are inserted into the label in plain text as well as in the form of a barcode. The franking labels are provided to the customer on the basis of intelligent PDF documents.

An exemplary embodiment of the present invention comprises various embodiments for creating and printing the label. Especially preferred exemplary embodiments are listed below:

After the customer has paid for the purchases in the shopping cart, the POP server receives a notification from the payment service provider about the completed payment transaction. Then a data record for the franking label purchased by the customer is generated in a document database. This data record contains especially an unambiguous document identification code for the intelligent PDF document, information indicating whether the label has already been printed with valid codes, and it also contains form data. The form data comprises the sender and recipient addresses of the mailpieces that are to be franked, and the routing code. Moreover, the form data includes the label identification code that, after the payment, is taken from a pool of previously generated codes. This code is also transmitted to the payment assurance system. Moreover, an intelligent PDF document is created which is a blank form with form fields for the above-mentioned form data. The document identification code serves to identify the PDF document.

The label is printed within the scope of the iPDF mechanism on the basis of a communication between the user client and the POP server or a license server that is associated with the POP server and that can access the document database. The SOAP interface of Acrobat Reader is used for the communication with the user client. After the PDF document has been opened, first of all, a consecutive checking procedure checks whether an Internet connection is present, whether the document identification code is valid and whether the label has not already been printed before. In order to carry out the latter two checking steps, a service of the POP server is called via the SOAP interface of Acrobat Reader and, after an appropriate query to the database, said service reports back whether a data record for the document identification code is present in the document database, and whether the postage indicium is marked as already having been printed before.

After the checking steps have been successfully executed, the form data stored in the database—except for the valid codes—is downloaded from the POP server via the interface of Acrobat Reader and inserted into the form fields of the PDF document. Instead of the valid codes, the PDF document initially contains only dummy codes so as to prevent the user from being able to make a copy of a valid label. Moreover, the content of the document is first clearly marked as a sample. For the printing, the PDF document provides its own functionality with which test print-outs as well as the printing of a valid label—referred to Web as the postage print-out—can be executed using appropriate buttons within the document. In the case of a test print-out, the sample of the label that is at first contained in the PDF document is printed with the dummy codes. In the case of a postage print-out, the valid label is printed, whereby the valid barcodes are called from the POP server after the appropriate button has been actuated. Moreover, on the basis of the actuation of the button for the postage print-out, it is entered in the document database of the POP server that the valid label has been printed and the button is faded out or switched to non-active status.

When the document is opened once again after a postage print-out, it is ascertained on the basis of the initially executed checking steps that the label has already been printed out before. In this case, at least one postage print-out is no longer permitted.

The label can have different appearances. It is preferably configured in such a manner that it allows an identification and/or control of mailpieces and, if applicable, also the coordination of a warehousing location.

Advantageously, the labels are scratch-resistant and impact-resistant as well as temperature-resistant.

Examples of such labels are:
barcode labels,
Electronic Article Surveillance (EAS) labels,
labels for merchandise tracking,
intelligent labels,
inventory labels,
pallet labels,
security labels,
thermo labels,
thermo-transfer labels,
transponder labels.

Encoded information is inserted into the labels as control instruments for parcel logistics.

In particular, the labels can contain consecutive numbering—optionally with a checksum—other types of numbering or address information.

A label that is to be printed is provided with a PDF envelope. The licensing information 304 can then be transmitted statically or dynamically inside this envelope within the scope of communication with the server 103.

Consequently, by incorporating the licensing information 304, a licensing service is provided for printing the PDF envelope. The license service controls the printing of the document contained in the PDF envelope.

Since intelligent documents can be provided in this manner, they are described below as iPDFs.

The following process steps are carried out here:

POP application: during (or possibly in advance of) the generation of the PDF, each PDF is linked to an unambiguous document ID that cannot be guessed by the user by trial-and-error.

In a refinement of an exemplary embodiment of the present invention, this document ID is embedded on the one hand into the iPDF and on the other hand also into a table of a database, for example, of the POP application.

The database can be located on any desired server. Access advantageously takes place via database connect, so that the application (Web-based, Java development) can send pertinent instructions, for example, SQL commands (insert and updates).

The integration of the mentioned components is advantageous from a performance and security standpoint.

In order to prevent multiple print-outs, mechanisms are built into the PDFs delivered to the user and, before every printing operation, they check whether the document has already been printed before.

In order to check this, a connection with a service provided by the POP application has to be made from the Acrobat Reader via which this checking procedure is carried out.

After the user has bought a product using the payment functionality of the application, all of the data for the generation of the PDFs is present.

At this point, the server application generates a data record for each PDF to be generated on the basis of the shopping cart and all of the information needed for the generation is already completely resolved in this data record.

An advantageous data record for controlling the one-time printing is depicted below.

Document Data Record

| Field name | Type | Description |
| --- | --- | --- |
| Document ID | ID (PK) | ID of the document. This ID is also embedded in the delivered iPDF envelope. |
| CreateDate | TimeStamp | Time stamp of the generation of the PDF |
| ValidUntil | TimeStamp | Valid until |
| Printed | TimeStamp | Was the PDF already printed? |
| DownloadedFirst | TimeStamp | When was the PDF downloaded for the first time? |
| DownloadedLast | TimeStamp | When was the PDF downloaded for the last time? |
| DownloadCounter | Integer | How often was the PDF downloaded? |
| FormData | Blob | The form data of the PDF. This includes: Sender address and recipient address. Codes for barcodes. Product services (e.g. green parcel) Information about selected additional services, insofar as they relate to the imprint. |

FormData contains all of the already resolved data in a structured form (XML) relating to the data to be imprinted. Thus, for example, the already generated parcel identifiers, routing codes and optionally additional information (also prices, although this is currently not provided for) are already given as numbers or characters strings. A subsequent calculation of such data is not provided for since this might possibly yield different results.

Furthermore, references to the PDF master copy as well as the coordinates for the imprint have to be given in this FormData field. Resource IDs from the configuration repository are used for this purpose. Since the resource behind a resource ID does not change during the lifetime of the application (i.e. also in a changed version by changing the application configuration), a generation of the PDF will always yield the same results.

It is advantageous to suppress the data from becoming visible at the end of a predefinable time interval. With such a suppression, this data can still be viewed for administration purposes and in order to keep a record for accounting obligations, but it is protected from being viewed or even used or changed by users.

In the manner described, it is possible to generate PDFs or other intelligent documents as set forth in an exemplary embodiment of the present invention on the basis of a document data record. The document data record has, for example, the field contents described above.

After a suitable request has been called up, a document ID can be made available to the user via a URL and can be downloaded later in the form of a URL.

EXAMPLE http://pop.dh1.de/
getPDF?documentId=abxkd12fszo8afwg30y

A PDF can be generated directly on the basis of the document ID.

Since the document downloaded by the user only constitutes an empty form, a general PDF—optionally individual for each product (product key)—can be made available.

The servlet that delivers the PDF should now rename the file name for the PDF in such a way that the document ID is contained in the file name.

Signing the Document or the Document Master Copy Via ARES 306

The master copies for generating the documents, referred below to as document master copies, are preferably signed offline by the Acrobat Reader Extension Server ARES during a development or preparation phase for a new product or a new method, especially a transport method, for goods to be provided with the label.

In the application, the document master copy signed by the ARES 306 is then imported into the configuration repository.

The signing of the document and/or of the document master copy via ARES 306 makes it possible to generate a key value on the basis of the content of the PDFs. In this manner, the Adobe Reader (reading program) that checks this signature is controlled, i.e. the functions—the intelligence—of the document are only archived when the signature generated in the Reader and the signature contained in the document match.

Such an activation of functions is also possible with other programs that contain the presented checking mechanisms. Accordingly, the documents can be processed with any program that has the presented functions.

iPDF Envelope, Sample Document and Postage Document

After the user has downloaded the generated PDF, the envelope of the PDF is displayed to him or her on the first page.

When the PDFs are downloaded in a suitable program, especially an Acrobat Reader, it is advantageous to carry out individual, several or all of the following checking steps:

compatibility of the reading program,
existence of an Internet connection,
validity of the document ID,
checking whether a print-out has already been made.

For the latter two checking steps, a service made available by the application is called via the SOAP interface of the Acrobat Reader, and this service reports back whether the transmitted document ID is present and/or is marked in the database as already having been printed before.

On the basis of the document ID, the form fields are downloaded via the SOAP interface by the POP's own server and then filled.

If no document ID could be ascertained, for example, since the user has renamed the PDF document, he or she is prompted via an Acrobat form field to enter the document ID. The document IDs are also included in the e-mail that is sent to the user.

Dummy codes are created for the sample printing of the barcodes/matrix codes, although these dummy codes might already have been provided with correct sender data and/or recipient data in plain text. The complete barcodes—especially with monetary information contained in them—are briefly set for the printing of a valid postage indicium (postage print-out), for example, by JavaScript.

Employed PDF Reader Functionality (Technology)

The application uses the following JavaScript functions for the dynamic query to the license server from the Acrobat Reader:

app.viewerVersion: for checking the Reader version.

SOAP.*: to check for an Internet connection.

document.getField("field name").display=display.hidden/display.visible: for fading in and out "sample" overprints document.print ({bUI: true, nStart: 1, nEnd: 1, bSilent: true, bAnnotation: true}) or document.print ({bUI: false, nStart: 1, nEnd: 1, bSilent: true, bAnnotation: true}) for directly printing the document without user interaction.

The actual PDFs to be printed are stored as annotation form fields (originally for visual feedback—e.g. when a button is pushed—in order to distinguish between the printed and non-printed states) and only switched to "visible" immediately before the printing.

Barcode fields. The Acrobat Reader supports form fields that display an appropriate barcode for a value (as a rule, numerical value).

As an alternative, special fonts that are embedded in the document can be used for barcode fields.

For barcode types that Acrobat Reader does not support internally or through additional fonts, the barcode can be downloaded as a bitmap image via an external URL. For this purpose, a servlet service that generates and makes available the appropriate bitmap would have to be implemented in the application.

The described functionalities have a number of advantages:

Since the user does not download an individualized PDF, the PDFs only have to be signed per template/product via the ARES server.

As a result, an ARES 306 is not needed during the normal operation of the application.

It is advantageous to use the ARES 306 to insert new document types—especially to insert new products of a service provider—in order to sign the PDF in question once. Within the application, the signed document is then inserted as a resource. This installation of the ARES 306 can be effectuated on any computer. The interface for signing a document master copy can be configured in a simple manner.

The download of the PDF is a simple—virtually static—delivery of a file by the POP application. Any performance-relevant processes for the imprint can be dispensed with.

The PDFs can be generated with standard tools that are provided, for example, by the Adobe Company (with Acrobat Professional, the position of the form fields can be defined). The filling of the PDF form fields within the Acrobat Reader is a standard function.

Moreover, by dispensing with the necessity of signing each individual PDF, any error sources or performance bottlenecks that might occur here are also eliminated.

The elaborations selected above relate to PDF documents. However, it is likewise possible to use documents and programs that have comparable functions.

Documents as referred to herein can preferably be displayed graphically. Depending on the area of application, they can be recorded manually or by machine. Moreover, depending on the area of application, it is also advantageous to provide for encryption.

An exemplary embodiment of the present invention also comprises documents that cannot be displayed graphically. Documents as referred to herein are especially SmartLabels. SmartLabels are RFID identification devices (transponders). They are suitable to be used for control processes in the processing or transporting of physical objects, especially of mailpieces or other goods that are to be transported.

The presented exemplary embodiments of the invention are associated with a number of advantages:

It is possible to change the layout of the labels in a simple manner and, to a limited extent, even to adapt the functionality of the "intelligent PDFs" without having to launch the application anew (unlike the case with Stampit-Web), i.e. only the PDF master copy is replaced. As an alternative, it is possible to provide a new format master copy on the production systems via configuration update/admin-tool.

An increase in performance is achieved so that less server capacity is needed.

Data protection and security are increased, because no application-specific data, addresses, product information, are contained in the PDF—in the PDF master copy—even when the PDF is stored, after the data has been transferred via SOAP call for printing and/or after the printing has been initiated.

In especially preferred exemplary embodiments of the invention, it is possible to ascertain and, if applicable, also to log the configuration of clients (user systems)—especially of user computers that are being employed, if applicable, including the program versions employed.

The use of identifier data further increases data security. The identifier data is preferably recognized by the fact that a signature is generated for the particular dynamic content and that this signature is transmitted along with the particular dynamic content.

Advantageously, the signature is once again generated at the destination of a completed communication (destination system), and the resultant value—especially a hash value—is compared to the value resulting from the transmitted signature.

Through a comparison of the values, it is possible to prevent a manipulation of the contents since the appertaining application logic only becomes active if the checks have transpired correctly.

An exemplary embodiment of the present invention also comprises the use of other programs than those presented.

In particular, it is possible to use other computer programs than those presented above, while employing the presented embodiment of the system and of the device.

By the same token, it is possible to use other file formats.

The software selected should be such that it can generate a file having the following properties:
1. Downloading the file should be possible.
2. Displaying and printing the label in the same form (frames, logos, variable texts) should be possible.
3. Printing barcode labels should be possible, ideally by integrating fonts.
4. It should be possible to use/activate an application logic (via Java Script, Visual Basic, .net, . . . ) in the file.
   This property is also achieved, for example, by Adobe Flash and by many Microsoft/Windows products from the Office environment.
4.1 Soap requests (HTTP requests) should be possible.
4.2 It should be possible to actuate a print dialog via the application logic.
5. It should be possible to transmit the file write-protected.
6. The file should be protected against changes to the application logic before or during the execution (especially during printing).

These requirements are also met, for example, by Microsoft Excel. In order to increase data security, an appropriate additional encryption is recommended for the embedded script code, which should be additionally secured.

It is advantageous to configure the intelligent documents in such a way that they make it possible to check program versions.

In particular, it is advantageous for the documents to be capable of checking which version or which implementation of a computer program and/or which operating system is installed on a client.

The invention is not limited to the areas of application presented.

When labels are generated for mailpieces, it is advantageous for them to contain information about identification, about routing, about advance postal instructions and about extra services associated with the shipping order.

Moreover, it is advantageous for the labels to contain customer and/or billing information.

The presented labels serve as information carriers and allow, for example, the acceptance, payment accounting, sorting, loading, special handling, delivery, issuing, billing, investigating, reworking, operating data processing, tracking and tracing, as well as archiving of a shipment.

In refinements of an exemplary embodiment of the present invention, the intelligent documents—especially the labels that are to be applied onto the mailpieces—contain information blocks. Here, it is advantageous to specify data types and/or data sizes for the information blocks. This specification is advantageously carried out in accordance with the specific logistical requirements.

Examples of dynamic contents that are inserted into the static frame are recipient address and information that allows shipment identification, for example, a shipment identification number.

The transmitted frame information serves to provide a clear, structured and formatted display of the dynamic contents.

Figure 4A:
FIG. 4a is a block diagram showing a first partial label of a label created according to an exemplary embodiment of the present invention.
Figure 4B:
FIG. 4b is a block diagram showing a second partial label of a label created according to an exemplary embodiment of the present invention.
Figure 5:
FIG. 5 is a block diagram showing another label according to an exemplary embodiment of the present invention.

FIGS. 4a, 4b and 5 show graphic depictions of intelligent documents created according to an exemplary embodiment of the present invention. The graphic depictions can be displayed, for example, on a monitor of a client or printed out and, if applicable, printed out for use as a shipping label for a mailpiece.

In order to create the documents, static contents are transmitted separately from the dynamic contents.

The static contents are, for example, the frame drawn in the figures as well as company information such as "DHL".

Dynamic contents that are inserted into the shipments include, for example, sender information, recipient information, account number, size information, shipment identification number and/or optionally also a product designation.

FIGS. 4a and 4b show a label according to the invention that has been split into two partial labels.

An alternative depiction is shown in FIG. 5.

FIG. 5 shows the label content by way of an example in a DIN A4 landscape format, placed next to each other.

For the person skilled in the art, it is a matter of course to select the specific graphic design of the label, including the depicted information—plain text components and machine-written components as well as, optionally, encrypted information—depending on the requirements of the shipping company that is transporting or handling the mailpieces.

In a refinement of an exemplary embodiment of the present invention, the dynamic contents are transmitted in electronic form by a party (sender) ordering a shipping procedure. The shipment data can be electronically transmitted before, during and after the shipments have been physically handed over to a shipping company.

A simultaneous electronic and physical transfer, however, is preferred in order to simplify the logistical processes.

In order to transmit the data, preferably a suitable set of numbers is prescribed.

Moreover, the labels can contain handling information, for example, for employees of the shipping company, especially for a deliverer. It is possible and practical to select a format that differs from other label contents for the graphic representation of individual handling functions.

The description above of exemplary embodiments of the invention making reference to the figures is intended to serve as an illustration and an example. The invention is not restricted to the embodiments presented.

In conjunction with the printing of labels using an intelligent document, an exemplary embodiment of the present invention is especially not limited to the presented types of transmission, types of formats or checking steps. On the contrary, the person skilled in the art recognizes that, within the scope of the invention, other types of transmission can also be selected and/or other formats can be used and/or other checking steps can be carried out, whose results are presented in the document, if applicable.

The person skilled in the art also realizes that an exemplary embodiment of the present invention can be used in other areas than those presented.

Thus, for example, it is possible to check the presence of the program execution environment in any desired intelligent document and to display the result of the checking.

The intelligent documents can be, for example, intelligent documents with animated graphics or forms. In particular, an exemplary embodiment of the present invention can be used with forms that are configured as intelligent documents and that are used in communication with official agencies.

On the basis of checking steps whose results are displayed with an exemplary embodiment of the present invention, it is possible, in particular, to check whether certain required fields of a form have been filled in.

Moreover, an exemplary embodiment of the present invention can also be used with intelligent documents that are protected against unauthorized access using the "intelligence". In this context, texts should be mentioned that can only be displayed and/or printed if the user is authorized to do so, whereby the authorization of the user is checked, for example, by a query made to the server by the intelligent document via a network.

The different handling of dynamic and static contents allows far-reaching configuration possibilities for individual documents or for documents that are to be created at time intervals and/or that are to be updated.

| List of reference numerals | |
|---|---|
| 101 | client |
| 102 | network |
| 103 | server |
| 104 | display device |
| 105 | memory |
| 106 | processor |
| 107 | printing device |
| 108 | database |
| 109 | input device |
| 201 | main area |
| 202 | button |
| 203 | button |
| 205 | status display |
| 206 | status field |
| 207 | status field |
| 208 | status field |
| 301 | PDF template |
| 302 | Web server |
| 303 | document data record |
| 304 | licensing information |
| 305 | intelligent document (example iPDF) |
| 306 | ARES |

What is claimed is:

1. A method comprising:

inserting displayable information into an intelligent document at a time when the intelligent document is created indicating a negative result of a first checking step, the intelligent document being created on a server comprising a database for logging a record of printing of postage indicium with embedded programs to be transmitted from the server via a network to a client and to be executed by a program execution environment of a display program to display the intelligent document on a display device of the client that can be executed upon occurrence of a precondition;

inserting one or more program modules into the intelligent document configured in such a way that after the intelligent document has been opened in the display program, the one or more program modules are automatically started if the program execution environment is present;

performing the first checking step to determine a presence of the program execution environment depending on whether the one or more program modules can be executed or not;

performing a second checking step to determine whether the network connection between the client and the network exists;

performing a third checking step to determine whether the database does not contain a record of printing of the postage indicium;

converting information indicating the negative result of the first checking step into information indicating a successful execution of the first checking step by executing the program modules;

providing displayable contents that include static contents and dynamic contents;

inserting the dynamic contents into the intelligent document separately from the static contents;

providing a button by the intelligent document for printing a displayed sample of the postage indicium clearly marked as sample as often as desired;

providing the valid postage indicium in a concealed area of the intelligent document that cannot be displayed by the display program on the display device; and actuating another button for printing the valid postage indicium, which is made visible after indication of the positive result of the first, second, and third checking steps.

2. The method recited in claim 1, comprising transmitting the static contents by a server via a network to a client.

3. The method recited in claim 1, comprising transmitting the dynamic contents by a server via a network to the client.

4. The method recited in claim 1, wherein the static contents and the dynamic contents are transmitted separately from each other.

5. The method recited in claim 4, wherein the transmission of the static contents takes place at a separate time relative to the transmission of the dynamic contents.

6. The method recited in claim 4, wherein the transmission of the static contents takes place via a different transmission route relative to the transmission of the dynamic components.

7. The method recited in claim 4, wherein the static contents are transmitted by a first server and the dynamic contents are transmitted by another server.

8. The method recited in claim 1, wherein the static contents are provided by a data source that differs from that for the dynamic contents.

9. The method recited in claim 1, wherein the static contents are stored in an area of a client.

10. The method recited in claim 2, wherein the static contents are transmitted in response to an occurrence of a first event.

11. The method recited in claim 10, wherein the first event is of a first event type.

12. The method recited in claim 3, wherein the dynamic contents are transmitted in response to an occurrence of a second event.

13. The method recited in claim 12, wherein the second event is of a second event type.

14. The method recited in claim 13, wherein the second event type differs from a first event type.

15. The method recited in claim 12, comprising performing a checking step to determine whether the second event has occurred.

16. The method recited in claim 12, wherein the second event differs from a first event.

17. The method recited in claim 1, comprising inserting a program module into the intelligent document, the program module configured to create displayable information indicating an event of a checking step in order to check whether the precondition has been met within the intelligent document.

18. The method recited in claim 17, wherein the checking step is carried out by the program module.

19. The method recited in claim 17, wherein, during the checking step, it is checked whether there is access to the network by sending a query by the same or another program module to the server.

20. The method recited in claim 17, wherein, during the checking step, a query to the server is made in which it is checked whether contents of the intelligent document have already been printed before.

21. The method recited in claim 1, comprising:
performing a one-time printing of a postage indicium; and
transmitting the intelligent document by the server via the network to the client.

22. The method recited in claim 21, comprising:
transmitting a message from the client to the server when the one-time printing of the postage indicium occurs; and logging the printing on the server on the basis of the message.

23. The method recited in claim 21, wherein a program for controlling the printing of the postage indicium can only be executed when a network connection exists between the client and the server, and when, on the basis of a query to the server, it is ascertained that that postage indicium had not been printed before.

24. The method recited in claim 1, wherein a program execution environment is a component of a display program.

25. A tangible, non-transitory, machine-readable medium that stores machine-readable instructions that are executable by a computer, the tangible, non-transitory, machine-readable medium comprising:

machine-readable instructions that, when executed by a computer, start an inserted program module automatically if a program execution environment is present as a check that the program execution environment is present, provide displayable contents that include static contents and dynamic contents, and insert the dynamic contents into an intelligent document separately from the static contents, provided a button for printing a displayed sample of a valid postage indicium clearly marked as sample as often as desired, provide the valid postage indicium in a concealed area of the intelligent document that cannot be displayed by a display program on the display device, and actuate another button for printing the valid postage indicium, which is made visible after indication of the positive result of the checking step, the intelligent document being produced with displayable information indicating a negative result of a checking step inserted into the intelligent document at a time when the intelligent document is created on a server, and with one or more inserted program modules to be transmitted from the server via a network to a client, the server comprising a database for logging a record of printing of the valid postage indicium, the inserted program modules being configured in such a way that after the intelligent document has been opened in the display program and the checking steps are performed, if the program execution environment is present, a network connection between the client and the network exists, and no record of printing of the valid postage indicium is present in the database, the inserted program modules are automatically started to convert the inserted displayable information indicating negative results of the checking step into information indicating a successful execution of the checking steps.

26. An intelligent document stored on a tangible, non-transitory, machine-readable medium, comprising a program that, when a precondition has been met, can be executed by a program execution environment and that contains contents that can be displayed by a display program, the intelligent document comprising a program module that is configured to create displayable information on a basis of static contents and of dynamic contents, wherein the intelligent document comprises displayable information indicating a negative result of a checking step that determines whether the program execution environment is present; and wherein the program module is configured in such a way that after the intelligent document has been opened in the display program, the program module is automatically started if the program execution environment is present, which implies that the program execution environment is present, converts the displayable information indicating the negative result of the checking step into information indicating a successful execution of the checking step, provides a button for printing a displayed sample of the postage indicium clearly marked as a sample as often as desired, provides the valid postage indicium in a concealed area of the intelligent document that cannot be displayed by the display program on the display device, and actuates another button for printing the valid postage indicium, which is made visible after indication of the positive result of the checking step.

* * * * *